(12) United States Patent
Kanda et al.

(10) Patent No.: US 9,742,984 B2
(45) Date of Patent: *Aug. 22, 2017

(54) IMAGE CAPTURING APPARATUS AND METHOD OF CONTROLLING THE SAME

(71) Applicant: CANON KABUSHIKI KAISHA, Tokyo (JP)

(72) Inventors: Akihiko Kanda, Kawasaki (JP); Yumi Watanabe, Tokyo (JP); Shun Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,725

(22) Filed: Mar. 10, 2016

(65) Prior Publication Data

US 2016/0191789 A1 Jun. 30, 2016

Related U.S. Application Data

(63) Continuation of application No. 14/224,665, filed on Mar. 25, 2014, now Pat. No. 9,313,469.

(30) Foreign Application Priority Data

Apr. 10, 2013 (JP) .................................. 2013-082499

(51) Int. Cl.
*H04N 5/232* (2006.01)
*H04N 9/04* (2006.01)
(Continued)

(52) U.S. Cl.
CPC .......... *H04N 5/23212* (2013.01); *G06T 5/50* (2013.01); *H04N 5/378* (2013.01); *H04N 9/045* (2013.01);
(Continued)

(58) Field of Classification Search
CPC ...... H04N 5/23212; H04N 9/07; H04N 5/378; H04N 9/68; H04N 9/045; H04N 9/64;
(Continued)

(56) References Cited

U.S. PATENT DOCUMENTS 6,597,868 B2\* 7/2003 Suda ...................... G03B 13/32
396/111
2010/0182478 A1\* 7/2010 Sawada .................. H04N 9/045
348/311

FOREIGN PATENT DOCUMENTS

CN 102177456 A 9/2011
CN 102472881 A 5/2012
(Continued)

OTHER PUBLICATIONS

The above foreign patent documents were cited in the Dec. 19, 2016 Japanese Office Action, which is enclosed without an English Translation, that issued in Japanese Patent Application No. 2013082499.

(Continued)

*Primary Examiner* — Twyler Haskins
*Assistant Examiner* — Padma Haliyur
(74) *Attorney, Agent, or Firm* — Cowan, Liebowitz & Latman, P.C.

(57) ABSTRACT

An image capturing apparatus comprises an image pickup device with a plurality of pixels each of which includes at least two photoelectric conversion portions, a readout unit configured to read out a first image signal and an added signal obtained by adding the first image signal and a second image signal, a subtraction unit configured to subtract the first image signal from the added signal, a focus detection unit configured to detect a focus state based on the first and the second image signal, and a limiter unit configured to suppress an output of the first photoelectric conversion portion and an output of the second photoelectric conversion (Continued)

portion not to exceed a predetermined threshold, wherein the limiter unit suppresses the output of the first photoelectric conversion portion and the second photoelectric conversion portion for different color filters.

9 Claims, 6 Drawing Sheets

(51) Int. Cl.
*H04N 9/64* (2006.01)
*H04N 9/68* (2006.01)
*G06T 5/50* (2006.01)
*H04N 5/378* (2011.01)
*H04N 9/07* (2006.01)
*H04N 5/217* (2011.01)
*H04N 5/369* (2011.01)

(52) U.S. Cl.
CPC ............. *H04N 9/07* (2013.01); *H04N 9/64* (2013.01); *H04N 9/68* (2013.01); *G06T 2207/10024* (2013.01); *G06T 2207/20224* (2013.01); *H04N 5/217* (2013.01); *H04N 5/3696* (2013.01)

(58) Field of Classification Search
CPC ........ H04N 5/217; H04N 5/3696; G06T 5/50; G06T 2207/20224; G06T 2207/10024
See application file for complete search history.

(56) References Cited

FOREIGN PATENT DOCUMENTS

| | | |
|---|---|---|
| CN | 102833472 A | 12/2012 |
| JP | 01-306809 A | 12/1989 |
| JP | H06-311417 A | 11/1994 |
| JP | 09-133857 A | 5/1997 |
| JP | 2009-021962 A | 1/2009 |
| JP | 2010-119022 A | 5/2010 |
| JP | 2010-140013 A | 6/2010 |
| JP | 2012-191400 A | 10/2012 |

OTHER PUBLICATIONS

The above foreign patent documents were cited in the Mar. 16, 2016 Korean Office Action, which is enclosed without an English Translation, that issued in Korean Patent Application No. 10-2014-0040953.

The above foreign patent documents were cited in the Nov. 4, 2016 Chinese Office Action, which is enclosed with an English Translation, that issued in Chinese Patent Application No. 201410143658.8.

\* cited by examiner

IMAGE CAPTURING APPARATUS AND METHOD OF CONTROLLING THE SAME

CROSS-REFERENCE TO RELATED APPLICATIONS

This application is a continuation of application Ser. No. 14/224,665, filed Mar. 25, 2014 the entire disclosure of which is hereby incorporated by reference.

BACKGROUND OF THE INVENTION

Field of the Invention

The present invention relates to an image capturing apparatus having an auto-focusing function.

Description of the Related Art

There is conventionally known a technique of performing focus detection at high speed and accuracy by using a focus detection method adopting a phase difference detection method in an image capturing apparatus including an imaging optical system and an image pickup device. In a focus detection technique using the phase difference detection method, a pupil division unit divides a light beam radiated from the imaging optical system into at least two areas, and the light beam of each area is photoelectrically converted to obtain a pair of focus detection signal strings of two images. A focus shift amount in a predetermined focal plane, that is, a defocus amount is detected from the relative image shift amount between the two signal strings. In focus detection using the phase difference detection method, in an in-focus state, the strengths of the signal strings of the two images coincide with each other, and the relative image shift amount should also be zero. However, due to vignetting of the focus detection light beam caused by the imaging optical system and various aberrations of the imaging optical system, the coincidence of the two images deteriorates, resulting in a focus detection error. Due to vignetting and various aberrations, the proportional relationship between the defocus amount and the relative image shift amount between the two images deteriorates. To perform focus detection at high accuracy, therefore, it is necessary to eliminate the errors. A technique for this purpose has also been proposed.

On the other hand, there has been proposed a technique in which a two-dimensional CMOS sensor or the like is used as an image pickup device to arrange focus detection pixels for phase difference detection on the sensor. An image capturing pixel and a focus detection pixel are arranged on the same plane. Therefore, when the image capturing pixel is in the in-focus state, the focus detection pixel is also in the in-focus state. For this reason, in principle, no relative image shift occurs between two images for phase difference detection in the in-focus state, and thus an error hardly occurs. Since, however, the focus detection pixel includes two photoelectrical conversion portions, a circuit for reading out accumulated pixel signals is complicated. A method of suppressing complication of a circuit for reading out pixel signals is described in Japanese Patent Laid-Open No. 2008-103885.

In the technique described in Japanese Patent Laid-Open No. 2008-103885, each of a plurality of focus detection pixels each including two photoelectric conversion portions outputs a signal obtained by adding output signals from the two photoelectric conversion portions.

According to Japanese Patent Laid-Open No. 2008-103885, however, when a value outputtable from the focus detection pixel is exceeded (saturated), crosstalk occurs due to leakage of charges between the two photoelectric conversion portions of the focus detection pixel. Crosstalk causes an output signal to include a signal in addition to a signal obtained by photoelectrically converting the light beam from the imaging optical system, thereby disabling correct focus detection.

SUMMARY OF THE INVENTION

The present invention has been made in consideration of the above problems, and suppresses the possibility that focus detection is disabled even if an image capturing apparatus including an image pickup device capable of detecting a phase difference has a saturated pixel.

According to the first aspect of the present invention, there is provided an image capturing apparatus comprising: an image pickup device with a plurality of pixels each of which includes at least two photoelectric conversion portions including a first photoelectric conversion portion for receiving light having passed through a portion of an pupil area of an imaging optical system and a second photoelectric conversion portion for receiving light having passed through a different portion of the pupil area of the imaging optical system, and a color filter of a predetermined color; a readout unit configured to read out, from the image pickup device, a first image signal obtained from the photoelectric conversion portion, and an added signal obtained by adding the first image signal obtained from the photoelectric conversion portion and a second image signal obtained from the second photoelectric conversion portion; a subtraction unit configured to obtain the second image signal by subtracting the first image signal from the added signal; a focus detection unit configured to detect a focus state of the imaging optical system based on the first image signal and the second image signal; and a limiter unit configured to suppress an output of the first photoelectric conversion portion and an output of the second photoelectric conversion portion not to exceed a predetermined threshold, wherein the limiter unit suppresses the output of the first photoelectric conversion portion and the output of the second photoelectric conversion portion for different color filters not to exceed the predetermined threshold with respect to the first image signal and the second image signal.

According to the second aspect of the present invention, there is provided a method of controlling an image capturing apparatus including an image pickup device with a plurality of pixels each of which includes at least two photoelectric conversion portions including a first photoelectric conversion portion for receiving light having passed through a portion of an pupil area of an imaging optical system and a second photoelectric conversion portion for receiving light having passed through a different portion of the pupil area of the imaging optical system, and a color filter of a predetermined color, the method comprising: a readout step of reading out, from the image pickup device, a first image signal obtained from the photoelectric conversion portion, and an added signal obtained by adding the first image signal obtained from the photoelectric conversion portion and a second image signal obtained from the second photoelectric conversion portion; a subtraction step of obtaining the second image signal by subtracting the first image signal from the added signal; a focus detection step of detecting a focus state of the imaging optical system based on the first image signal and the second image signal; and a limiter step of suppressing an output of the first photoelectric conversion portion and an output of the second photoelectric conversion portion not to exceed a predetermined threshold, wherein in the limiter step, the output of the first photoelectric conversion portion and the output of the second photoelectric conversion portion for different color filters are suppressed not to exceed the predetermined threshold with respect to the first image signal and the second image signal.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings.

Figure 1:
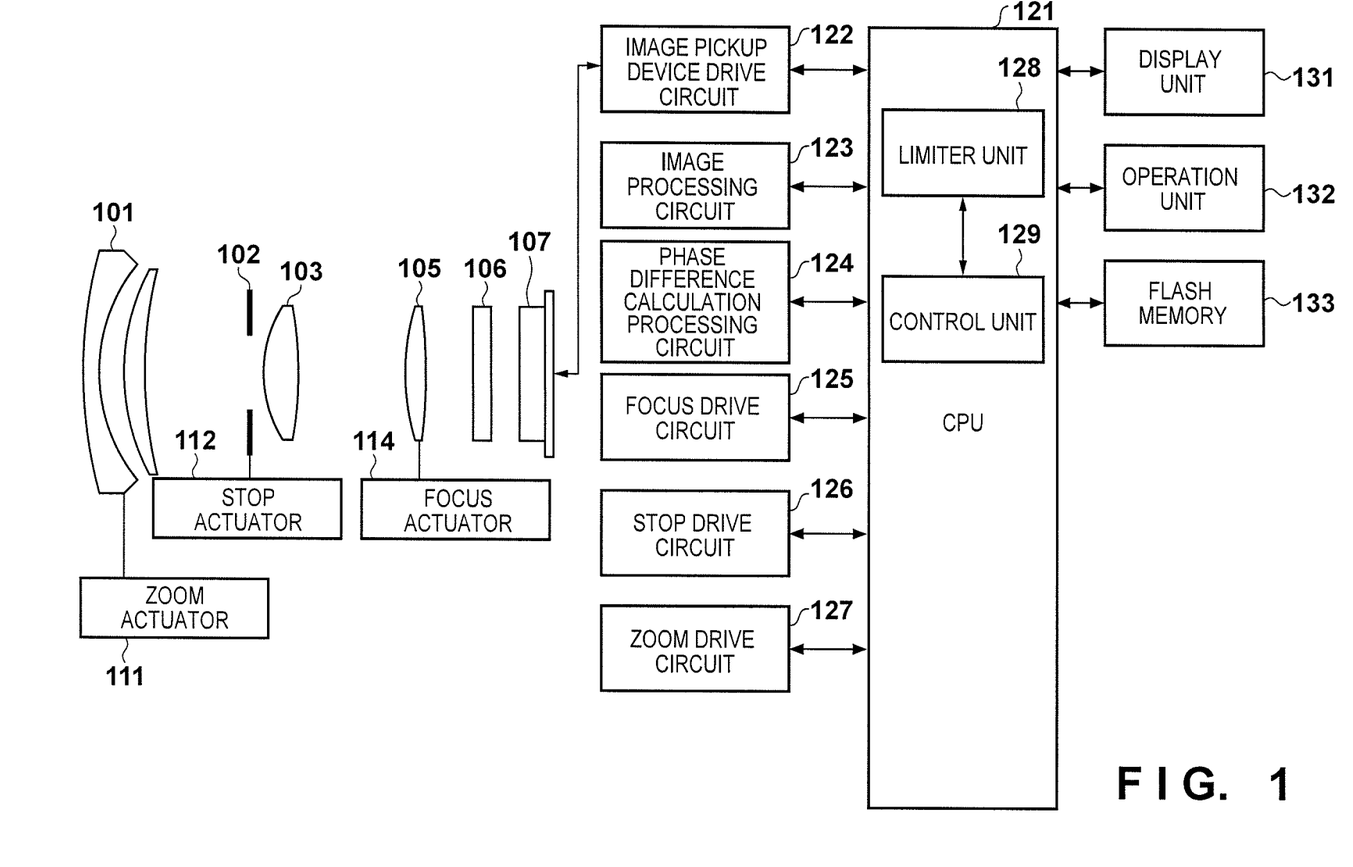
FIG. 1 is a block diagram showing the arrangement of an image capturing apparatus according to an embodiment of the present invention.

FIG. 1 is a block diagram showing the arrangement of an image capturing apparatus according to an embodiment of the present invention. FIG. 1 shows an electronic camera which integrates an imaging optical system and a camera body with an image pickup device, and can record a moving image and a still image. Referring to FIG. 1, reference numeral 101 denotes a first lens group which is disposed at the front end of the imaging optical system for forming an object image and held to be movable along an optical axis; 102, a stop which adjusts the diameter of its opening, thereby adjusting the amount of light in imaging and also functions as an exposure time adjustment shutter in imaging of a still image; and 103, a second lens group. The stop 102 and the second lens group 103 are driven together along the optical axis, and, in interlocking with the movement operation of the first lens group 101, provide a variable magnification effect (a zoom function). Reference numeral 105 denotes a third lens group which carries out focus adjustment by moving along the optical axis; and 106, an optical low-pass filter which is an optical element for reducing false color and moiré of a captured image.

Reference numeral 107 denotes an image pickup device which includes pixels capable of performing focus detection and is composed of a CMOS sensor and its peripheral circuits. A two-dimensional, single-CCD color sensor in which light-receiving pixels arranged M pixels in the horizontal direction by N pixels in the vertical direction and an on-chip Bayer arrangement primary color mosaic filter is disposed is used as the image pickup device 107. Each pixel of the image pickup device 107 includes a plurality of photoelectric conversion portions and a color filter.

Reference numeral 111 denotes a zoom actuator which carries out a variable magnification operation by rotating a cam cylinder (not shown) manually or by the actuator to drive the first lens group 101 through the third lens group 105 along the optical axis; 112, a stop actuator which controls the diameter of the opening of the stops 102 and adjusts the amount of light for imaging, and also controls the exposure time in imaging of a still image; and 114, a focus actuator which drives the third lens group 105 along the optical axis to adjust the focus.

Reference numeral 121 denotes a CPU which includes an arithmetic unit, ROM, RAM, A/D converter, D/A converter, and communication interface circuit for performing various kinds of control of the camera body. In addition, based on predetermined programs stored in the ROM, the CPU 121 drives the various circuits of the camera, and executes a series of operations of focus control (AF), imaging, image processing, recording, and the like.

Reference numeral 122 denotes an image pickup device drive circuit which controls the image capturing operation of the image pickup device 107 and A/D-converts obtained image signals to transmit the converted image signals to the CPU 121; 123, an image processing circuit which performs processing such as color interpolation, γ conversion, and image compression on the images obtained by the image pickup device 107; and 124, a phase difference calculation processing circuit serving as a focus detection unit, which obtains the image shift amount between an A image and a B image by correlation calculation using, as an AF A image signal and an AF B image signal, signals obtained from the two photoelectric conversion portions of each pixel of the image pickup device 107, thereby calculating a focus shift amount (focus state). Furthermore, reference numeral 125 denotes a focus drive circuit which controls to drive the focus actuator 114 based on the focus detection result to drive the third lens group 105 along the optical axis, thereby performing focus adjustment; 126, a stop drive circuit which controls to drive of the stop actuator 112, thereby controlling the opening of the stop 102; and 127, a zoom drive circuit which drives the zoom actuator 111 according to the zoom operation of the user.

Reference numeral 128 denotes a limiter unit which suppresses the added signal of the A image signal and the B image signal not to exceed a predetermined threshold; and 129, a control unit which generates an A image and (A+B) image by controlling the limiter unit when the added signal of the A image signal and the B image signal exceeds the predetermined threshold in the limiter unit 128.

Reference numeral 131 denotes a display unit such as an LCD which displays information about the imaging mode of the camera, a preview image in imaging, a confirmation image after imaging, and an in-focus state display image in focus detection; 132, an operation unit which is constituted by a power switch, imaging start switch, zoom operation switch, imaging mode selection switch, and the like; and 133, a detachable flash memory which records captured images including a moving image and a still image.

Figure 2:
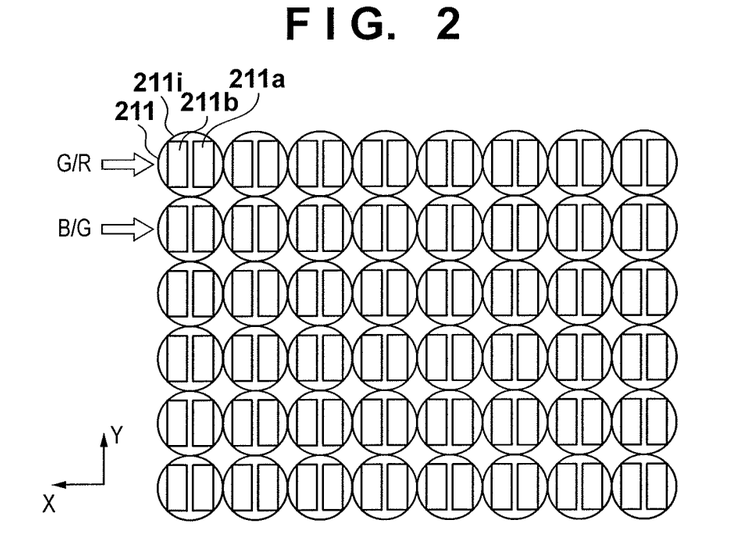
FIG. 2 is a view showing an array of pixels of an image pickup device according to the embodiment.

FIG. 2 is a view showing an array of the pixels of the image pickup device 107 according to the embodiment of the present invention. FIG. 2 shows a state when observing, from the imaging optical system side, a range of six rows in the vertical (Y) direction and eight columns in the horizontal (X) direction of a two-dimensional CMOS area sensor. The Bayer arrangement is applied to color filters. Color filters of green and red are alternately provided for pixels on an odd-numbered row from left. Furthermore, color filters of blue and green are alternately provided for pixels on an even-numbered row from the left. A circle 211$i$ represents an on-chip microlens. Each of a plurality of rectangles arranged within the on-chip microlenses represents a photoelectric conversion portion which is divided into a first photoelectric conversion portion 211a for receiving light having passed through a portion of the pupil area of the imaging optical system and a second photoelectric conversion portion 211b for receiving light having passed through another portion of the pupil area of the imaging optical system.

In this embodiment, the photoelectric conversion portion of each of all the pixels is divided into two areas in the X direction. With respect to a photoelectric conversion signal of each divided area, a signal can be independently read out from the first photoelectric conversion portion 211a for each color filter but a signal cannot be independently read out from the second photoelectric conversion portion 211b. The signal of the second photoelectric conversion portion 211b is calculated by subtracting the signal of the first photoelectric conversion portion 211a from a signal read out after adding the outputs of the first photoelectric conversion portion and the second photoelectric conversion portion.

The signals from the first photoelectric conversion portion 211a and the second photoelectric conversion portion 211b can be used not only for focus detection using the phase difference detection method in a method (to be described later) but also for generating a 3D (3-dimensional) image formed by a plurality of images having parallax information. On the other hand, information obtained by adding the outputs of the divided photoelectric conversion portions is used as a general captured image.

Pixel signals when performing focus detection using the phase difference detection method will now be described. In this embodiment, the microlens 211i and the divided photoelectric conversion portions 211a and 211b of FIG. 2 pupil-divide a light beam radiated from the imaging optical system. Assume that an image composed by concatenating outputs from the photoelectric conversion portions 211a in a plurality of pixels 211 within a predetermined range arranged on one row is set as an A image which is the first image, and an image composed by concatenating outputs from the photoelectric conversion portions 211b in the same pixels is set as a B image which is the second image. In this case, detecting, by correlation calculation, the relative image shift amount between the A image as the first image and the B image as the second image which have been generated in this manner can detect a focus shift amount in a predetermined area, that is, a defocus amount.

Figure 3:
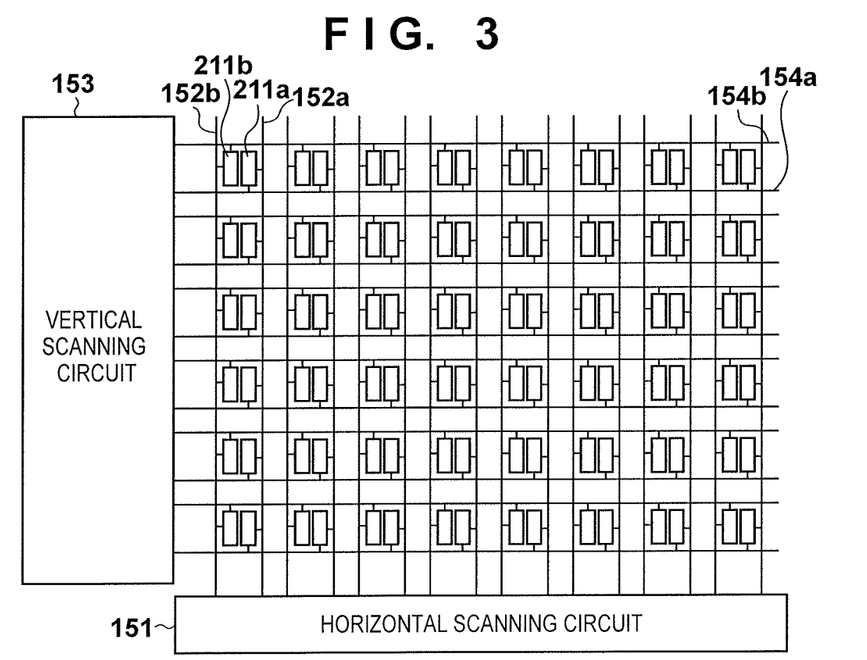
FIG. 3 is a circuit diagram showing the image pickup device according to the embodiment.

FIG. 3 is a view showing the arrangement of a readout circuit in the image pickup device 107 according to this embodiment. Reference numeral 151 denotes a horizontal scanning circuit; and 153, a vertical scanning circuit. Horizontal scanning lines 152a and 152b and vertical scanning lines 154a and 154b are arranged in the boundary portions between the respective pixels. Signals are read out from the respective photoelectric conversion portions to the outside via these scanning lines.

Note that the image pickup device 107 according to this embodiment has two types of readout modes. The first readout mode is called an all-pixel readout mode, which is used to capture a high-resolution still image. In this case, signals are read out from all the pixels. The second readout mode is called a thinning readout mode, which is used to only record a moving image or display a preview image. In this case, since the number of pixels required is smaller than the total number of pixels, the apparatus reads out signals from only pixels remaining after thinning out the pixel groups at a predetermined ratio in both the X and Y directions.

It is only necessary to read out an (A+B) image for a general image for imaging. To detect a phase difference in a plurality of distance measurement areas, however, an A image signal and a B image signal are read out and the image shift amount between the A image and the B image is detected by correlation calculation, thereby calculating a defocus amount.

Figure 4:
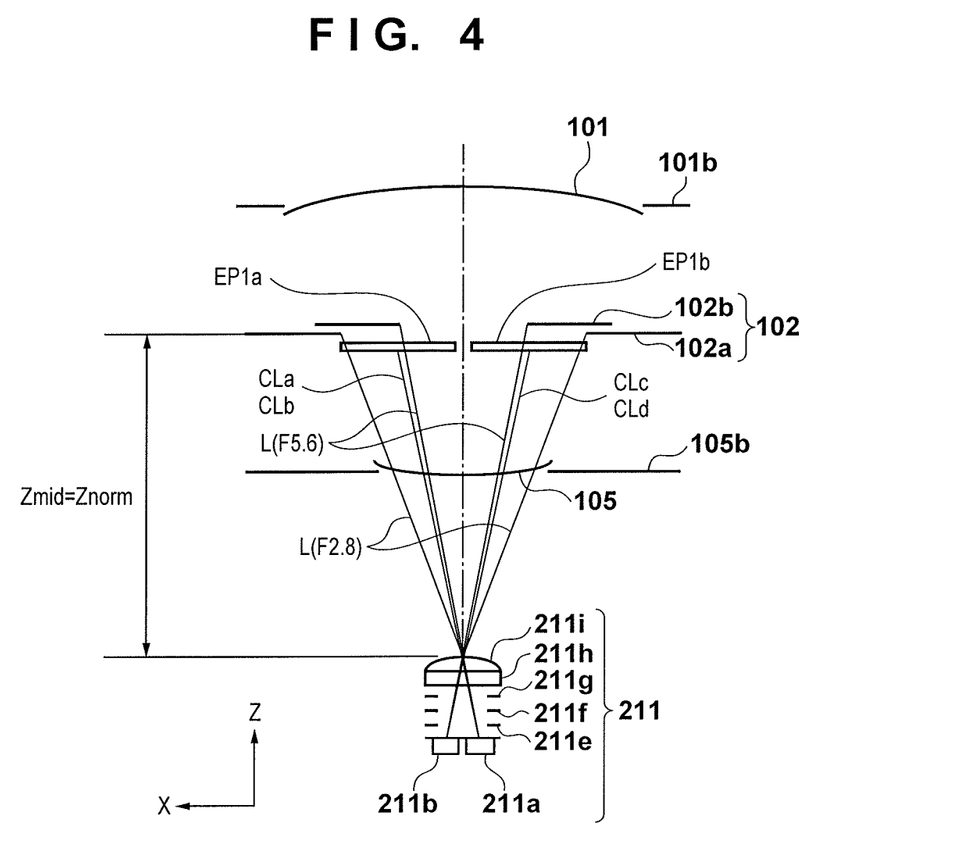
FIG. 4 is a view showing the optical principle of an imaging optical system according to the embodiment.

FIG. 4 is a view for explaining the conjugate relationship between the exit pupil plane of the imaging optical system and the photoelectric conversion portions of the image pickup device 107 which are arranged near a portion corresponding to an image height of 0, that is, the center of an image plane. The photoelectric conversion portions 211a and 211b in the image pickup device and the exit pupil plane of the imaging optical system are designed with on-chip microlenses to have a conjugate relationship. In general, the exit pupil of the imaging optical system almost coincides with a plane on which an iris stop for light amount adjustment is placed. On the other hand, the imaging optical system according to this embodiment is a zoom lens having a variable magnification function. If a variable magnification operation is performed, an imaging optical system of some optical type changes in size or distance from the image plane of the exit pupil. FIG. 4 shows a state in which the focal length of the imaging optical system corresponds to a middle position between the wide-angle end and the telephoto end, that is, "Middle". An exit pupil distance in this state is represented by Zmid. Assuming that this distance is a standard exit pupil distance Znorm, the shape of the on-chip microlens is designed.

Referring to FIG. 4, reference numeral 101 denotes a first lens group; 101b, a lens barrel member which holds the first lens group; 105, a third lens group; 105b, a lens barrel member which holds the third lens group; 102, the stop; 102a, an aperture plate which defines an opening diameter in a full-aperture state; and 102b, stop blades for adjusting the opening diameter in a stopped-down-aperture state. Note that the members 101b, 102a, 102b, and 105b which act to limit the light beam passing through the imaging optical system are illustrated as optical virtual images when observed from the image plane. In addition, a composite opening near the stop 102 is defined as the exit pupil of the lens, and the distance from the image plane is defined as Zmid, as described above.

The pixel 211 includes, from the lowermost layer, photoelectric conversion portions 211a and 211b, wiring layers 211e to 211g, a color filter 211h, and the on-chip microlens 211i. The on-chip microlens 211i projects the photoelectric conversion portions 211a and 211b onto the exit pupil plane of the imaging optical system. Projection images are represented by EP1a and EP1b.

If the stop 102 is in the full-aperture state (for example, F2.8), the outermost portion of the light beam passing through the imaging optical system is represented by L(F2.8). The projection images EP1a and EP1b are not eclipsed by the stop opening. On the other hand, if the stop 102 is in the stopped-down-aperture state (for example, F5.6), the outermost portion of the light beam passing through the imaging optical system is represented by L(F5.6). The outer sides of the projection images EP1a and EP1b are eclipsed by the stop opening. Note that at the center of the image plane, the eclipsed states of the projection images EP1a and EP1b are symmetrical with respect to the optical axis, and the amounts of light received by the photoelectric conversion portions 211a and 211b are equal.

A measure taken when the output value of the photoelectric conversion portion of this embodiment exceeds an upper limit value (is saturated) will be explained next. Each of the photoelectric conversion portions of each pixel receives a light amount from the light beam passing through the imaging optical system, and outputs a signal corresponding to the light amount by photoelectric conversion. In the case of a high-luminance object with a large amount of light, however, the upper limit value of the light amount which can be accumulated in the photoelectric conversion portions 211a and 211b is exceeded to cause leakage of charges to the adjacent photoelectric conversion portions, resulting in crosstalk. Crosstalk occurs between the A image signal generated from the photoelectric conversion portion 211a and the B image signal generated from the photoelectric conversion portion 211b, resulting in image shift amount error between the A image signal and the B image signal. Therefore, an error occurs in the defocus amount obtained by detecting the image shift amount by correlation calculation, thereby disabling setting of a desired object in the in-focus state.

In this embodiment, in a process of generating a B image signal, a B image signal is generated by subtracting an A image signal from an (A+B) image signal. An outputtable upper limit value is set for an image signal. In this embodiment, the same upper limit value is set for the image signals of the A, B, and (A+B) images. When the image signal of the A image reaches the outputtable upper limit value, the output signal of the (A+B) image also reaches the upper limit value. As a result, the (A+B) image signal and the A image signal also reach the upper limit value. That is, when the A image signal takes the upper limit value, the (A+B) image signal takes the same upper limit value, and the B image signal is generated by subtracting the A image signal from the (A+B) image signal, thereby outputting 0. In this case, the A image signal takes the upper limit value and the B image signal takes 0, resulting in generation of an error image signal. Therefore, even if the image shift amount between the A image and the B image is detected by correlation calculation to calculate a defocus amount, a desired object cannot be set in the in-focus state. Furthermore, even if the A image signal has not reached the upper limit value, when the (A+B) image is in a saturated state, the image signal is lost upon generating a B image. In this case, even if a defocus amount is calculated from the image shift amount between the A image and the B image by correlation calculation, a desired object cannot be set in the in-focus state.

As described above, to set a high-luminance object in the in-focus state even if each pixel is saturated, it is necessary to control the image signals so that the A image signal and the (A+B) image signal do not reach the upper limit value. In the embodiment, the limiter unit 128 for suppressing the A image signal and the B image signal not to exceed the predetermined threshold is provided and the control unit 129 for controlling the limiter unit 128 is provided, thereby controlling the image signals not to reach the upper limit value.

In this embodiment, since the A image signal is converted into a luminance signal by adding the pixel values of the color filters of green (to be referred to as G1 hereinafter) and red (to be referred to as R hereinafter) of the odd-numbered rows and those of the color filters of blue (to be referred to as B hereinafter) and green (to be referred to as G2 hereinafter) of the even-numbered rows, a threshold is set for each of G1, R, B, and G2. With this arrangement, even if the value of the specific color G1, R, B, or G2 reaches the upper limit value, the limiter unit 128 sets a threshold, and the control unit 129 suppresses each image signal not to exceed the threshold.

For the B image signal, the limiter unit 128 sets a threshold with respect to its luminance signal. This is done for the following reason. That is, processing of generating a B image for each of G1, R, B, and G2 is equivalent to processing of temporarily storing each of the A image and (A+B) image for each of G1, R, B, and G2, and generating G1, R, B, and G2 of a B image. The scales of a circuit for storing a signal, a circuit for generating a signal, and the like become large. Therefore, the signal of a B image is generated from the luminance signals of the A image and (A+B) image. For this reason, for the B image, the limiter unit 128 sets a threshold with respect to its luminance signal, and the control unit 129 suppresses the luminance signal not to exceed the threshold.

Figure 6A:
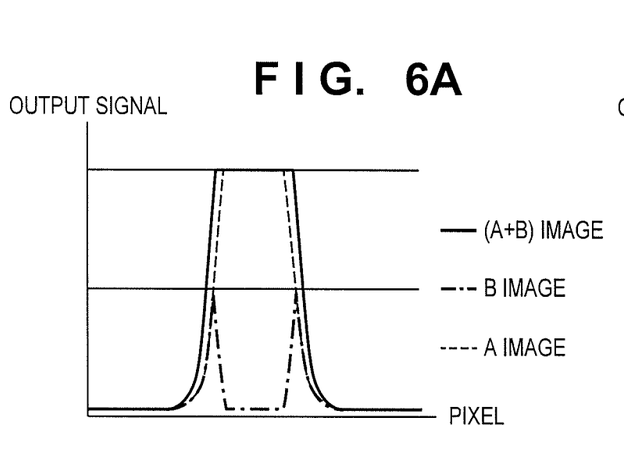
FIGS. 6A to 6D are graphs each for explaining the relationship between a pixel and an output signal according to the embodiment.
Figure 6B:
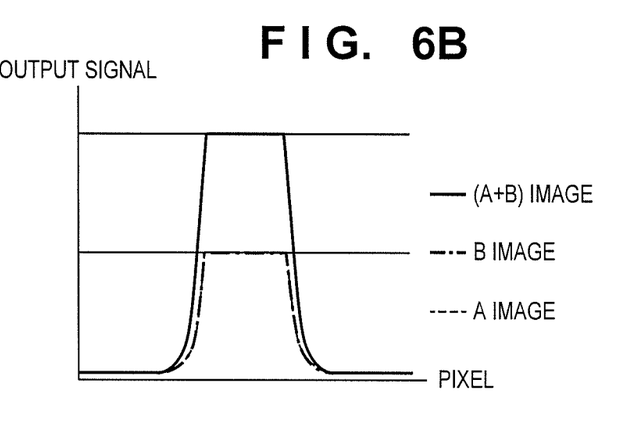
Figure 6C:
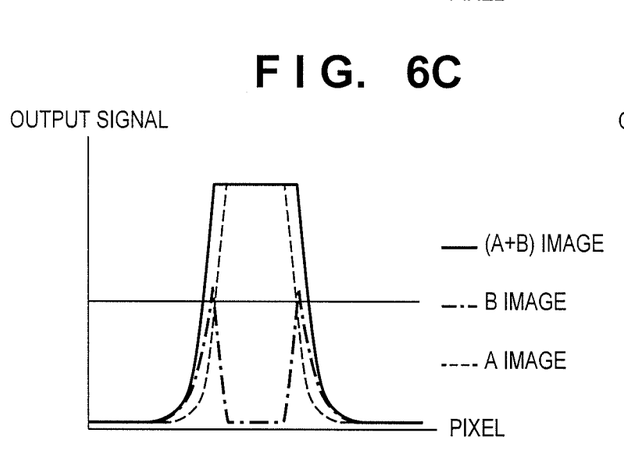
Figure 6D:
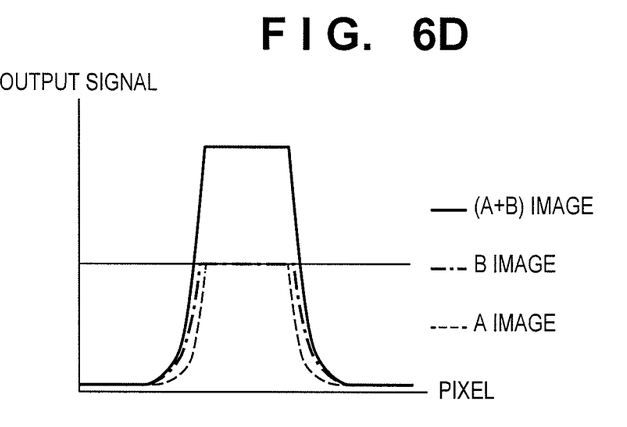
Figure 7:
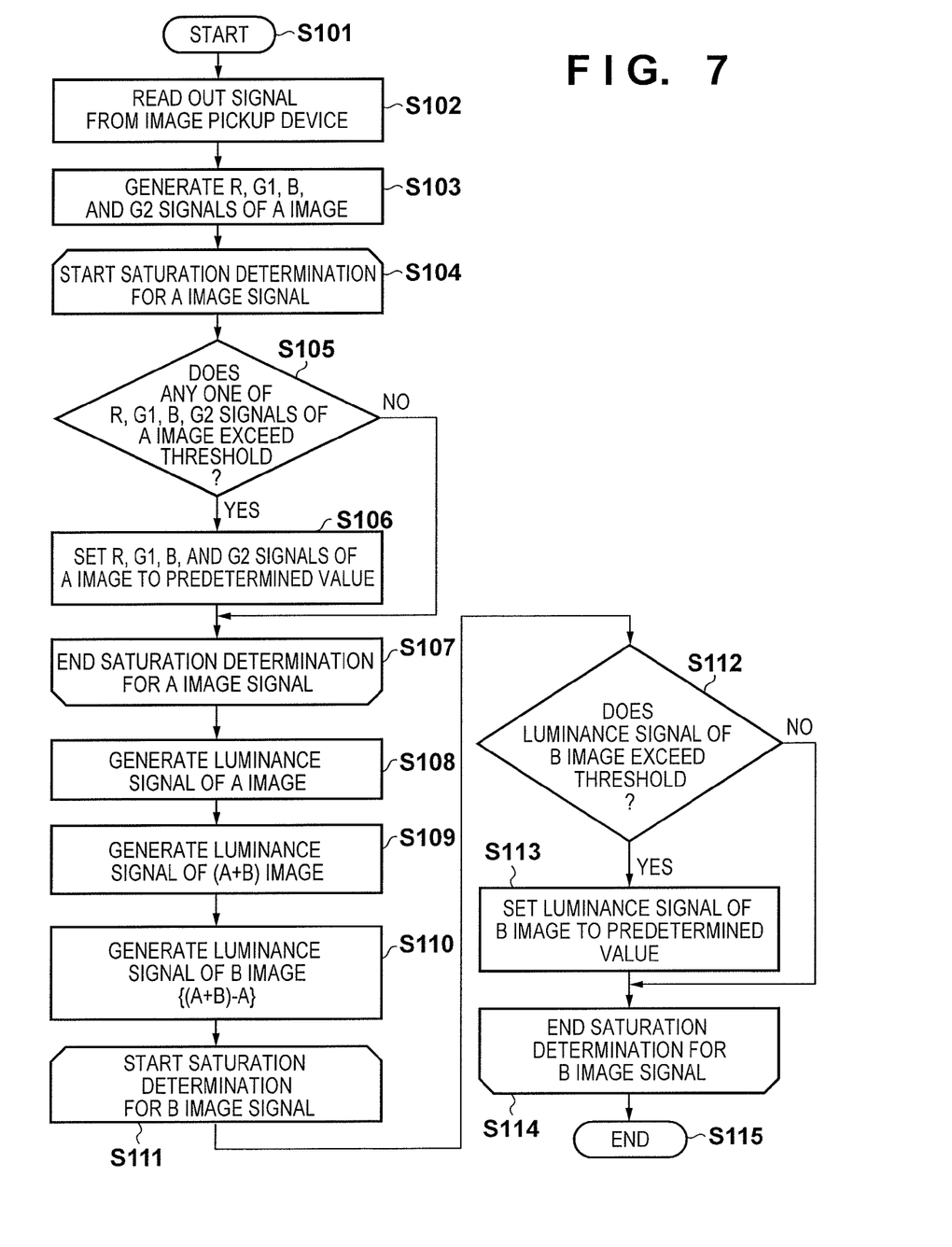
FIG. 7 is a flowchart illustrating the operation of the image capturing apparatus according to the embodiment.

A saturation determination method for controlling a signal from each photoelectric conversion portion of the embodiment not to exceed the upper limit value will be described with reference to FIGS. 5A to 7. Each of FIGS. 5A to 5D shows an incident light amount from the imaging optical system and the output signal of the image pickup device. The abscissa represents the incident light amount and the ordinate represents the output signal. A solid line indicates the (A+B) image, a dotted line indicates the A image, and a one-dot dashed line indicates the B image. Each of FIGS. 6A to 6D shows an example of an actual signal in the in-focus state. The abscissa represents pixels on an arbitrary row and the ordinate represents an output signal. FIG. 7 is a flowchart illustrating an operation according to the embodiment.

Figure 5A:
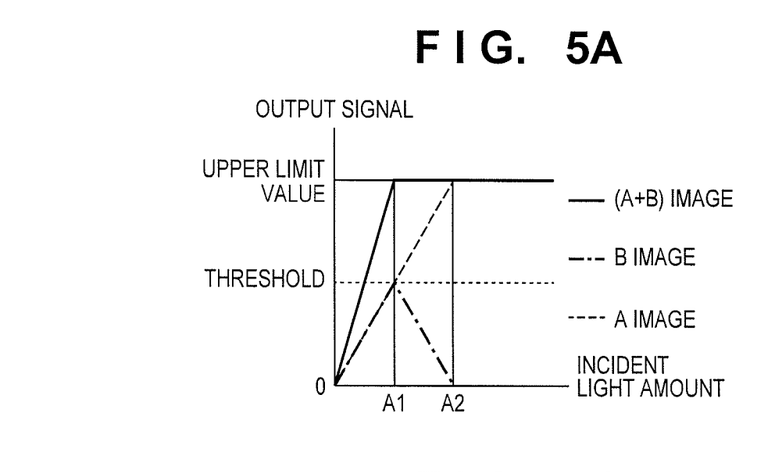
FIGS. 5A to 5D are graphs each for explaining the relationship between an incident light amount and an output signal.
Figure 5B:
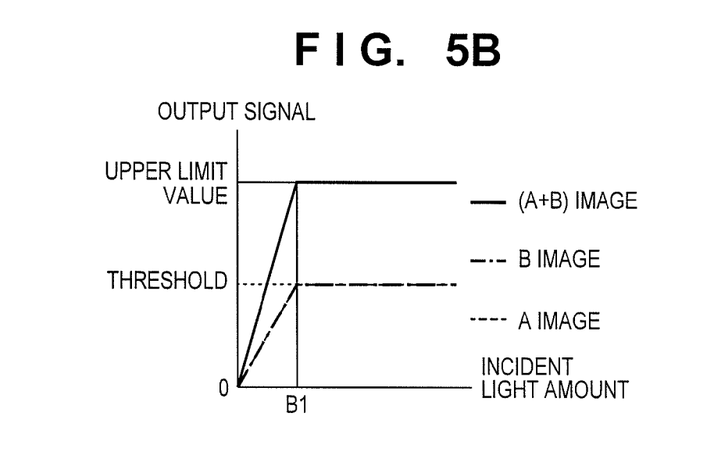

FIG. 5A shows a case in which saturation determination is not performed and FIG. 5B shows a case in which saturation determination is performed. In the case of the actual signal, FIG. 6A shows a case in which saturation determination is not performed and FIG. 6B shows a case in which saturation determination is performed. In the interval from 0 to A1 in which the incident light amount is small in FIG. 5A, since each pixel signal does not reach the upper limit value even if the incident light amount is photoelectrically converted (an area up to A1), both the A image signal and the B image signal reflecting the incident light amount can be output. In the interval after A1 in which the incident light amount is large in FIG. 5A, when the (A+B) image signal exceeds the upper limit value, the signal of the B image itself decreases because the B image is generated by subtracting the A image from the (A+B) image. That is, in this embodiment, the upper limit values of the respective image signals are equal. Therefore, when the A image signal exceeds ½ the upper limit value, the B image signal starts to decrease due to the influence of the A image. That is, when the A image signal exceeds ½ the upper limit value, the B image signal decreases due to the influence of the A image signal. In other words, as the A image signal increases, the B image signal should also increase. However, after the A image signal exceeds the upper limit value, the B image signal decreases as the A image signal increases. That is, the B image signal unwantedly changes inversely. Consequently, as shown in FIG. 6A, the image coincidence between the A image and the B image extremely deteriorates. As described above, even if correlation calculation is performed, the image coincidence deteriorates and thus the calculated defocus amount is not correct, thereby disabling setting of the desired object in the in-focus state.

A case in which saturation determination is performed will be described with reference to FIG. 5B. FIG. 5B assumes that the image signals of the A image and B image take the same value. The limiter unit 128 sets, as a threshold, a value which sets the output of the image signal of the A image to ½ the upper limit value, and the control unit 129 suppresses the image signals not to exceed the threshold. With this arrangement, both the image signals of the A image and the B image are equal to or smaller than ½ the upper limit value, and thus the image signal of the (A+B) image does not reach the upper limit value. As described above, performing saturation determination enables correction calculation without impairing the image coincidence between the A image and the B image in the in-focus state, as shown in FIG. 6B, thereby calculating a correct defocus amount.

In an area in which the peripheral portion of the image pickup device, that is, the image height is large, the diameter of the exit pupil becomes small due to eclipse (vignetting) of the imaging optical system. The received light amount of the pixel decreases, and the received light amounts of the two photoelectric conversion portions become unequal. As the opening diameter of the stop decreases, the nonuniformity of the received light amount becomes significant. As described above, the received light amounts of the two photoelectric conversion portions 211a and 211b in one pixel may be different from each other. Saturation determination when the values of the A image signal and the B image signal as the signals from the two photoelectric conversion portions 211a and 211b are different from each other will be explained with reference to FIGS. 5C, 5D, 6C, and 6D.

Figure 5C:
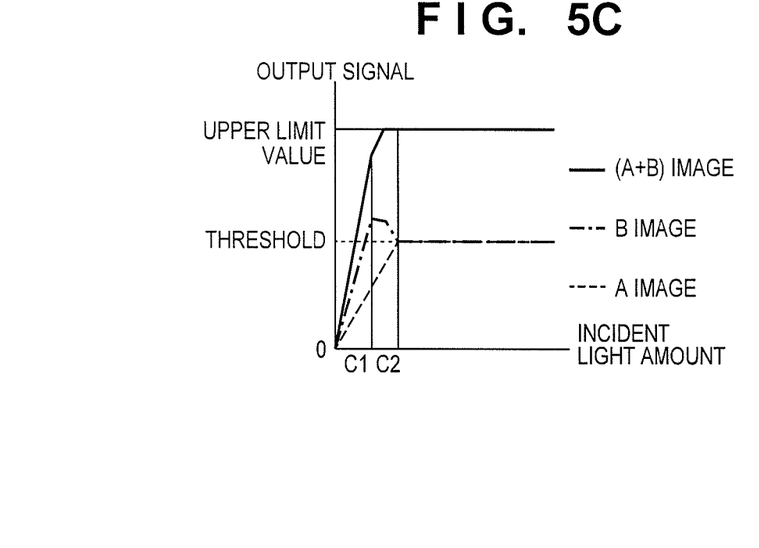
Figure 5D:
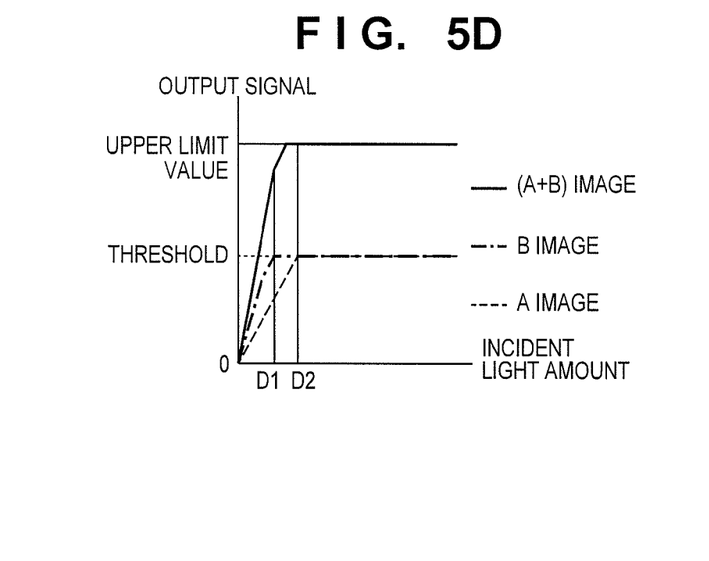

FIG. 5C shows a case in which saturation determination is performed for not the B image but the A image and FIG. 5D shows a case in which saturation determination is performed for both the A image and the B image. Each of FIGS. 5C and 5D shows a case in which the B image signal is larger than the A image signal. Even if the A image signal is equal to or smaller than ½ the upper limit value, the B image signal may have already exceeded ½ the upper limit value, and thus the signal of the (A+B) image may reach the upper limit value. Since the B image signal is generated by subtracting the A image signal from the (A+B) image signal, a false signal is unwantedly output to the B image signal because the (A+B) image signal has exceeded the upper limit value. Consequently, as shown in FIG. 6C, the image coincidence between the A image and the B image extremely deteriorates, and thus it is impossible to calculate a correct defocus amount from the image shift amount by correlation calculation.

In this embodiment, as shown in FIG. 5D, a threshold is also set for the B image signal. More specifically, the threshold is set so that the B image signal is equal to or smaller than ½ the upper limit value. By setting the threshold for the B image signal, a situation in which only the B image signal exceeds ½ the upper limit value is avoided. This can generate the B image signal while preventing a situation in which one of the A image signal and the B image signal exceeds ½ the upper limit value to cause a false signal due to saturation of the (A+B) image signal to mix into the B image signal. Consequently, as shown in FIG. 6D, it is possible to calculate a defocus amount from the image shift amount between the A image and the B image by correlation calculation without impairing the image coincidence between the A image and the B image, thereby enabling a high-luminance object, for which a pixel is saturated, to enter the in-focus state.

An operation according to this embodiment will be described with reference to the flowchart shown in FIG. 7. The process starts in step S101. In step S102, a signal from the image pickup device 107 is read out, and the process advances to step S103. In step S103, R, G1, B, and G2 signals of the A image signal are generated, and the process advances to step S104. In step S105, it is determined for each of the output R, G1, B, and G2 signals of the A image whether the signal output exceeds a threshold. If the threshold is not exceeded, the process advances to step S107; otherwise, the process advances to step S106. In step S106, the A image signal exceeding the threshold is set to a predetermined value equal to or smaller than the threshold, and saturation determination is equally performed for the R, G1, B, and G2 signals of the A image on the next line. Upon completion of saturation determination for all the A image signals or the A image signals within a predetermined AF frame, saturation determination is terminated in step S107, and the process advances to step S108. In step S108, all the R, G1, B, and G2 signals of the A image are added to generate a luminance signal, and the process advances to step S109. In step S109, the luminance signal of the (A+B) image is generated by adding the luminance signal of the A image and that of the B image, and the process advances to step S110. In step S110, to start saturation determination for the B image signal, the luminance signal of the B image is generated by subtracting the luminance signal of the A image from that of the (A+B) image. In step S112, it is determined whether the luminance signal of the B image exceeds a threshold. If the threshold is not exceeded, the process advances to step S114; otherwise, the process advances to step S113. In step S113, the luminance signal of the B image is set to a predetermined value equal to or smaller than the threshold, and saturation determination is performed for the B image luminance signal on the next line. Upon completion of saturation determination for all the B image signals or the B image signals within the AF frame, the process advances to step S114 and ends in step S115.

As described above, after the (A+B) image signal is converted into a luminance signal, the B image is generated and saturation determination is performed for the luminance signal of the B image. Although it is possible to perform saturation determination for the R, G1, B, and G2 signals of the B image, an additional memory for storing these signals is required, thereby increasing the circuit scale. As in this embodiment, by adding the R, G1, B, and G2 signals of each of the (A+B) image and the B image to obtain a corresponding luminance signal, and performing saturation determination for the B image using its luminance signal, it is possible to decrease the circuit scale and calculate a desired defocus amount. The above procedure allows calculation of a defocus amount from the image shift amount between the A image and the B image by correlation calculation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-082499, filed Apr. 10, 2013, which is hereby incorporated by reference herein in its entirety.

What is claimed is:

1. An imaging apparatus including an image sensor having a plurality of pixels each including at least two photoelectric conversion portions and a focus adjustment unit for performing a phase-difference detection type focus adjustment using image signals detected by the photoelectric conversion portions the imaging apparatus comprising:
   a readout unit configured to readout a first image signal from each of the photoelectric conversion portions and added image signal as a sum of the first image signal;
   a subtraction unit configured to obtain a second image signal by subtracting the first image signal from the added signal; and a suppression unit configured to suppress at least the second image signal not to exceed a predetermined value before performing the focus adjustment, wherein the subtraction unit subtracts a luminance signal generated from the first image signal of the luminance signal generated from the added image signal, and wherein the suppression unit suppresses the luminance signal of the second image signal obtained by the subtraction unit.

2. The imaging apparatus according to claim 1, wherein the suppression unit suppresses the first image signal not to exceed the predetermined value.

3. The imaging apparatus according to claim 1, further comprising a generation unit configured to generate the luminance signal corresponding to each of the first image signal and the added image signal.

4. The imaging, apparatus according to claim 3, wherein the image sensor includes on-chip Bayer arrangement color filters, and wherein the generation unit generates the luminance signal by combining the image signals corresponding to the color mosaic filters of red, green, and blue.

5. The imaging apparatus according to claim 1, further comprising a detection unit configured to detect a defocus amount in a predetermined area based on the first image signal and the second image signal to perform the focus adjustment.

6. The imaging apparatus according to claim 5, further comprising a processing unit configure to generate a 3D image based on the first image signal and the second image signal.

7. The imaging apparatus according to claim 1, wherein the predetermined value is less than or equal to ½ an upper limit value, the upper limit value being a maximum amount of light which the photoelectric conversion portions can receive.

8. The imaging apparatus according to claim 1, further comprising a determination unit configured to perform saturation determination for at least the second image signal, wherein the suppression unit suppresses the second image signal in a case that the determination unit determines the second image signal is in a saturation state.

9. A method of controlling an imaging apparatus including an image sensor having a plurality of pixels each including at least two photoelectric conversion portions and a focus adjustment unit for performing a phase-difference detection type focus adjustment using image signals detected by the photoelectric conversion portions, the method comprising:

reading out a first image signal from each of the photoelectric conversion portions and added image signal as a sum of the first image signal;

obtaining a second image signal by subtracting the first image signal from the added image signal; and suppressing at least the second image signal not to exceed a predetermined value before performing the focus adjustment, wherein in the obtaining, a luminance signal generated from the first image signal is subtracted from the luminance signal generated from the added image signal, and wherein in the suppressing, the luminance signal of the second image signal obtained by the subtraction is suppressed.

* * * * *